United States Patent
Harper (10) Patent No.: US 9,816,510 B2
(45) Date of Patent: Nov. 14, 2017

(54) FAN CONTAINMENT SYSTEM

(71) Applicant: ROLLS-ROYCE PLC, London (GB)

(72) Inventor: Cedric Brett Harper, Derby (GB)

(73) Assignee: ROLLS-ROYCE plc, London (GB)

(*) Notice: Subject to any disclaimer, the term of this patent is extended or adjusted under 35 U.S.C. 154(b) by 1142 days.

(21) Appl. No.: 14/160,985

(22) Filed: Jan. 22, 2014

(65) Prior Publication Data

US 2014/0271157 A1 Sep. 18, 2014

(30) Foreign Application Priority Data

Feb. 13, 2013 (GB) .................................. 1302493.0

(51) Int. Cl.
*F04D 17/00* (2006.01)
*F01D 11/12* (2006.01)
(Continued)

(52) U.S. Cl.
CPC .............. *F04D 17/00* (2013.01); *F01D 5/20* (2013.01); *F01D 5/225* (2013.01); *F01D 11/122* (2013.01); *F01D 11/127* (2013.01); *F01D 21/045* (2013.01); *F04D 29/526* (2013.01); *F05D 2250/11* (2013.01); *F05D 2250/182* (2013.01); *F05D 2250/183* (2013.01); *Y02T 50/672* (2013.01); *Y02T 50/673* (2013.01)

(58) Field of Classification Search
CPC .... F01D 11/122; F01D 21/045; F01D 11/127; F01D 5/20; F01D 5/225; F04D 29/526; Y02T 50/673; Y02T 50/672; F05D 2250/183; F05D 2250/11; F05D 2250/182

USPC .......................................... 415/173.4, 200, 9
See application file for complete search history.

(56) References Cited

U.S. PATENT DOCUMENTS 5,188,505 A    2/1993  Schilling et al.
5,403,148 A    4/1995  Forrester
(Continued)

FOREIGN PATENT DOCUMENTS

EP    2 149 680 A2    2/2010
EP    2 363 576 A2    9/2011
GB    2469447 A       10/2010

OTHER PUBLICATIONS

Search Report issued in European Patent Application No. 14 15 1866 dated Apr. 3, 2014.
(Continued)

*Primary Examiner* — Mark Laurenzi
*Assistant Examiner* — Wesley Harris
(74) *Attorney, Agent, or Firm* — Oliff PLC (57) ABSTRACT

A fan containment system arranged to be fitted around an array of radially extending fan blades mounted on a hub in an axial gas turbine engine. Each fan blade has a respective tip. The system includes: a cylindrical fan case including a hook projecting in a radially inward direction and positioned axially forward of the radial array of fan blades; a fan track liner disposed on the radially inner surface of the fan case; and a damaging tool which projects radially inwards from the fan case towards the tips. The damaging tool has a tip radially outward of the fan blade tips. The damaging tool is configured that in the event that one of the fan blades is released from the hub, the tip of the damaging tool damages the fan blade tip of the released fan blade to promote penetration of the fan blade into the fan track liner.

16 Claims, 6 Drawing Sheets

(51) Int. Cl.
F04D 29/52 (2006.01)
F01D 5/20 (2006.01)
F01D 5/22 (2006.01)
F01D 21/04 (2006.01)

(56) References Cited

U.S. PATENT DOCUMENTS

| | | |
|---|---|---|
| 7,338,250 B2 | 3/2008 | Martindale et al. |
| 2004/0013518 A1 | 1/2004 | Booth |
| 2010/0028129 A1 | 2/2010 | Reed |
| 2010/0028130 A1 | 2/2010 | Reed |
| 2010/0266384 A1 | 10/2010 | Evans et al. |
| 2011/0217156 A1* | 9/2011 | McMillan ............ F01D 21/045 415/9 |
| 2011/0286839 A1 | 11/2011 | Wojtyczka et al. |

OTHER PUBLICATIONS

Search Report issued in British Application No. 1302493.0 dated Jul. 19, 2013.

* cited by examiner

FAN CONTAINMENT SYSTEM

FIELD OF INVENTION

The present invention relates to gas turbine engines. In particular the present invention relates to a fan containment system for a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core, although in an alternative configuration the fan may be driven via a gear chain from a turbine.

The fan comprises an array of radially extending fan blades mounted on a rotor and will usually provide upwards of seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

The fan is surrounded by a fan containment system and is typically located at the front end of the gas turbine engine. Located in an upstream position, the fan and fan containment system must be designed to withstand the rigours of normal operation, for instance ice and other foreign object ingestion. Additionally, the fan and fan containment system must withstand, as far as possible, a bird striking the engine. In the extreme case, upon ingestion of a bird or other foreign object for example, a fan blade may be released from the rotor. In such an event the fan containment system must be designed to contain the released fan blade so as to minimise damage to the aircraft and its vital operating systems. The fan containment system therefore has a dual purpose of forming a portion of the outer duct of the fan system and retaining detached fan blades in the event of catastrophic failure.

The major component of the fan containment system is a fan case. It is known to construct the fan case as a generally cylindrical or frustoconical containment ring surrounding the fan. The fan case may not be strictly cylindrical and may follow, from front to back, the profile of the tips of the fan blade in the axial direction of the fan. It is known to provide relatively thick metal containment rings to ensure containment of a released fan blade. It is also known to provide locally thickened isogrid metallic containment rings. Furthermore, it is also known to wrap a fibrous material such as Kevlar around a relatively thin metallic containment ring. In the event that a fan blade is released from the rotor and passes through the relatively thin metallic containment ring, the fibrous material contains the fan blade. Conventionally, it is necessary to provide a fan track liner between the fan and the fan case.

Figure 2:
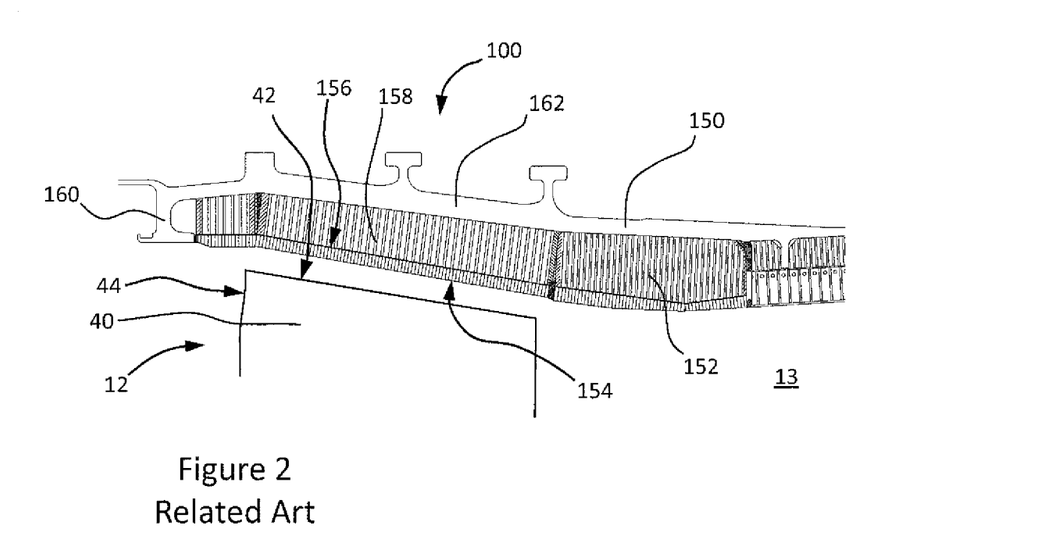
FIG. 2 is a detailed partial view of a cross-section through a typical fan case arrangement of a gas turbine engine.

A conventional fan containment arrangement 100 is illustrated in FIG. 2 and surrounds a fan 12 comprising an array of radially extending fan blades 40. Each fan blade 40 has a leading edge 44 and fan blade tip 42. The fan containment arrangement 100 comprises a fan case 150. The fan case 150 has a generally frustoconical or cylindrical containment portion 162 and a hook 160. The hook 160 is positioned axially forward of an array of radially extending fan blades 40. A fan track liner 152 is mechanically fixed or directly bonded to the fan case 150. The fan track liner 152 may be adhesively bonded to the fan case 150. The fan track liner 152 is provided as a structural filler to bridge a deliberate gap provided between the fan case 150 and the fan 12. The gap allows for a strong containment fan case whilst compensating for normal movements the fan rotational envelope. Such out-of-round or wobble movements may be caused by out-of-balance or gyroscopic effects.

The fan track liner 152 has, in circumferential layers, an attrition liner 154, a honeycomb layer 158 and a septum 156. The septum 156 acts as a bonding layer between the attrition liner 154 and the honeycomb layer 158. The honeycomb layer 158 may be an aluminium honeycomb. The tips 42 of the fan blades 40 are intended to pass as close as possible to the fan track liner 152 when rotating. The attrition liner 154 is therefore designed to be abraded away by the fan 12 during initial operation and normal operational movements of the fan 12 to ensure the gap between the rotating fan blade tips 42 and the fan track liner 152 is as small as possible. The fan blades 40 effectively make their own 'track' or path in the attrition liner 154 when the engine 10 is first run up. During normal operations of the gas turbine engine, ordinary and expected movements of the fan blade 40 rotational envelope cause abrasion of the attrition liner 154. This allows the best possible seal between the fan 12 and the fan track liner 152 and so improves the effectiveness of the fan 12 in driving air through the engine.

The purpose of the hook 160 is to ensure that, in the event that a fan blade 40 detaches from the rotor, the fan blade 40 will not be ejected through the front, or intake, of the gas turbine engine. During such a fan-blade-off event, the fan blade 40 travels rapidly outwards as a centripetal force no longer maintains the fan blade's rotational trajectory. Impact with the cylindrical containment portion 162 of the fan case 150 prevents the fan blade 40 from travelling any further in a radially outward direction. The fan blade 40 will also move forwards in an axial direction as the blade 40, although no longer retained in position on the rotor, responds to the reaction force acting on the blade 40 from the air passing through the fan 12. This axially forward and radially outward motion results in the leading edge 44 of the fan blade 40 colliding with the hook 160 in the region of the fan blade tip 42. Thus the fan blade 40 is captured by the hook 160 and further axially forward movement is prevented. The cylindrical containment portion 162 and hook 160 of fan case 150 therefore combine to contain the released fan blade 40. Thus the fan blade 40, or fragments thereof, are less likely to cause damage to structures outside of the gas turbine engine casings, in particular the aircraft fuselage itself.

As can be seen from FIG. 2, for the hook 160 to function effectively, a released fan blade 40 must penetrate a fan track liner 152 in order for its forward trajectory to intercept with the hook. If the attrition liner 154 is too hard then the released fan blade 40 may not penetrate the fan track liner 152. The released fan blade 40 is therefore more likely to skip over the fan track liner 152, thus missing the hook 160 entirely, and exit from the front of the engine. Such an event where a fan blade exits from the front of the gas turbine engine would be classed as an uncontained failure.

However, the fan track liner 152 must also be stiff enough to withstand the rigours of normal operation without sustaining damage. This means the fan track liner 152 must be strong enough to withstand ice and other foreign object impacts without exhibiting damage for example. Thus there is a design conflict, where on one hand the fan track liner 152 must be hard enough to remain undamaged during normal operation, for example when subjected to ice impacts, and on the other hand allow the tip 42 of the fan blade 40 to penetrate the liner. It is a problem of balance in making the fan track liner 152 sufficiently hard enough to sustain foreign object impact, whilst at the same time, not be so hard as to alter the preferred hook-interception trajectory of a fan blade 40 released from the rotor.

This problem is further exacerbated by the tendency in modern gas turbine engines to provide a fan having fewer, but larger, fan blades. These larger fan blades tend to have a longer chord length. It follows then, that this larger chord length leads to a fan blade which is likely to have increased difficulty in penetrating the fan track liner in the event of a fan blade being released. This is because the fan blade tips will have larger cross-sectional area. A larger cross-sectional area means the energy contained within a released fan blade will be spread over a greater area of the fan track liner; therefore, the likelihood of the fan blade tips penetrating the fan track liner is reduced. Further still, if any gas turbine engine fan is operating at a relatively lower rotational speed, then it is more difficult to guarantee a released fan blade will penetrate the fan track liner, irrespective of the cross-sectional area of the fan blade tip.

SUMMARY OF THE INVENTION

It is an object of the invention to provide a fan containment system which ensures that the tip of a released fan blade will penetrate the fan track liner and thus be captured by the hook on the fan case.

According to a first aspect of the invention there is provided a fan containment system arranged to be fitted around an array of radially extending fan blades (e.g. metallic fan blades) mounted on a hub in an axial gas turbine engine, each fan blade having a respective fan blade tip, the fan containment system comprising:

a generally cylindrical fan case including a hook, the hook projecting in a generally radially inward direction and positioned axially forward of the radial array of fan blades when the fan containment system is fitted around the radial array of fan blades;

a fan track liner disposed on the radially inner surface of the fan case; and a damaging tool which projects radially inwards from the fan case towards the fan blade tips when the fan containment system is fitted around the array of radially extending fan blades, the damaging tool having a tip which is radially outward of the fan blade tips during normal operation of the gas turbine engine, wherein the damaging tool is configured such that in the event that, during operation of the gas turbine engine, one of the fan blades is released from the hub, the tip of the damaging tool damages the fan blade tip of the released fan blade so as to promote penetration of the fan blade into the fan track liner and ensure the fan blade collides with the hook.

The damaging tool promotes the earlier deformation of the fan blade to increase the likelihood that the fan blade will penetrate through the fan track liner and be retained by the hook. The damaging tool is also effective in encouraging penetration of the fan track liner by the released fan blade at lower fan speeds when the released fan blade has lower energy. The damaging tool destroys the fan blade tip so as to reduce its cross-sectional area in so doing making it easier for the fan blade to penetrate the liner track liner. The damaging tool acts as a point over which the fan track liner may break when the fan blade strikes the fan track liner. In addition to promoting blade penetration, this also has a benefit in reducing the size of, and therefore energy contained within, the debris from the fan track liner.

The fan containment system may have any one of or, to the extent that they are compatible, any combination of the following features.

The damaging tool may be a cutting tool. The damaging tool may have a sharp edge. Optionally, the edge may lie on a plane perpendicular to the axial direction of the fan case.

The damaging tool may comprise a wedge shaped cylindrical rib disposed against the radially inner surface of the fan case. The wedge may have a symmetrical cross-sectional profile. The wedge may have an asymmetrical cross-sectional profile such that it is inclined aft or forwards towards the respective back or front of the gas turbine engine.

The damaging tool may be castellated so as to form a plurality of teeth.

The damaging tool may comprise an array of radially extending individually formed teeth.

The teeth may have a generally triangular profile. The teeth may have a generally rectangular profile. The teeth may be circumferentially skewed.

The damaging tool may be integral to the fan case. The damaging tool may be mechanically fixed to the fan case.

The damaging tool may be disposed around the entire circumference of the radially inner surface of the fan case.

The damaging tool may be one of a plurality of damaging tools spaced apart in the axial direction of the fan case.

The damaging tool may follow a path disposed against the radially inner surface of the fan case. The path may be configured so as to direct a released fan blade towards the hook, which has been found to further improve containment performance. Optionally, the fan blade tip may define a chord line and the path disposed against the radially inner surface of the fan case may be generally parallel to the chord line when fitted around the array of radially extending fan blades. The path may be a helical path such that the damaging tool may have a helical shape by way of following the helical path disposed against the radially inner surface of the fan case. The sharp edge may follow a corresponding helical path.

The damaging tool may be one of an array of damaging tools disposed around the radially inner surface of the fan case in a circumferential direction of the radially inner surface.

The fan track liner may comprise a radially outer honeycomb layer and a radially inner attrition layer. The honeycomb layer and radially inner attrition layer may be separated by a septum. The tip of the damaging tool may be coincident with the radially outer surface of the attrition liner and/or the septum.

The damaging tool may project partially through the thickness of the fan track liner. The damaging tool may project through the thickness of the fan track liner up to the radially outer surface of the attrition liner e.g. up to a septum layer separating the honeycomb layer (or filler layer of alternate construction) and attrition liner. Thus the damaging tool does not interfere with the normal operation of the gas turbine engine.

According to another aspect of the invention there is provided a fan assembly comprising a fan containment system according to the first aspect and a radial array of fan blades (e.g. metallic fan blades) mounted to a hub. If one of the fan blades of the fan assembly is released from the hub and moves radially outwards during operation of the gas turbine engine, the damaging tool may damage the fan blade tip so as to reduce the cross-sectional area of the fan blade tip.

According to a further aspect of the invention there is provided a gas turbine engine comprising a fan containment system according to the first aspect.

DESCRIPTION OF THE DRAWINGS

The invention will now be described, by way of example only, with reference to the accompanying drawings in which.

DETAILED DESCRIPTION

Figure 1:
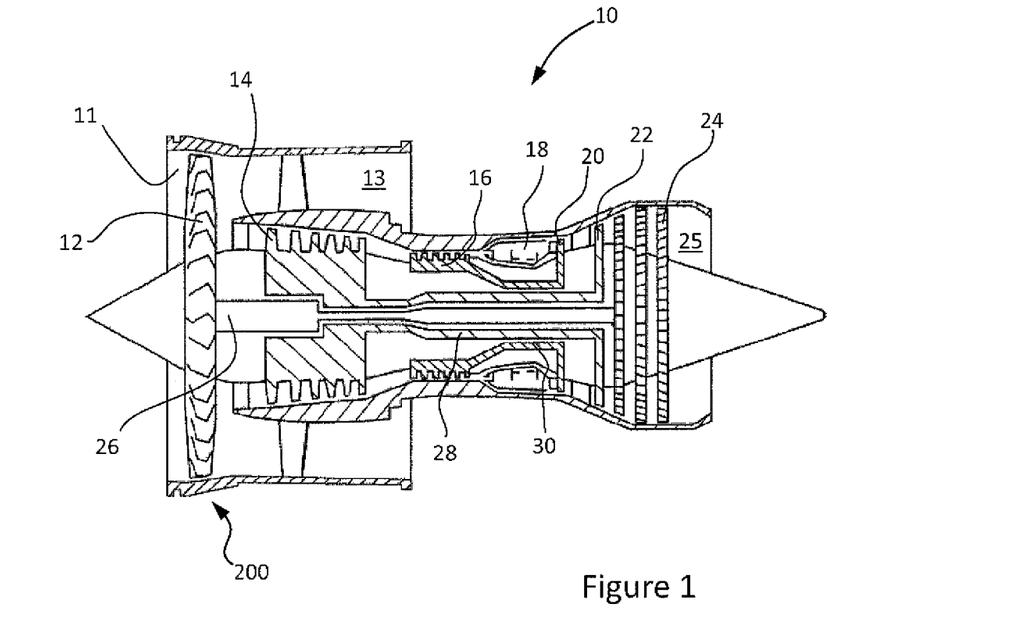
FIG. 1 is a cross-section through the rotational axis of a high-bypass gas turbine engine incorporating an embodiment of the present invention.

With reference to FIG. 1 a high-bypass gas turbine engine is indicated at 10. The engine 10 comprises, in axial flow, series an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 18, 20, 22 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine 10 thrust.

Figure 3A:
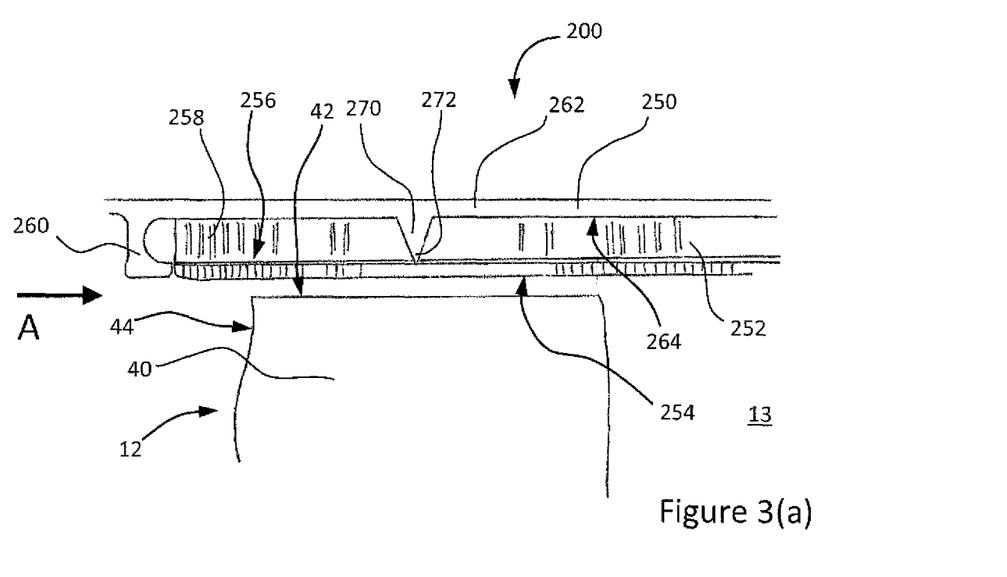
FIG. 3(a) is a partial view of the cross-section through and parallel to the rotational axis of the gas turbine engine of FIG. 1 showing a fan containment arrangement incorporating an embodiment of the present invention.

The intake fan 12 comprises an array of radially extending fan blades 40 that are mounted to the shaft 26. The shaft 26 may be considered a hub at the position where the fan blades 40 are mounted. In the present embodiment, fan blades 40 are metal fan blades. FIG. 1 shows that the fan 12 is surrounded by a fan containment arrangement 200, or fan containment system, that also forms one wall or a part of the bypass duct 13. FIG. 3(a), which illustrates an example of the fan containment arrangement 200 in detail, shows that each fan blade 40 has a fan blade tip 42 and a leading edge 44.

By way of comparison, a conventional fan containment arrangement 100 is shown in FIG. 2 which is described above. When installed on a conventional gas turbine engine, the conventional fan containment arrangement 100 would occupy the same or a similar position that the fan containment arrangement 200 occupies on the gas turbine engine 10, which is indicated in FIG. 1. In a similar vein, a fan of a conventional gas turbine engine has the same or a similar structure to that of the intake fan 12 of the gas turbine engine 10; for this reason the same reference numerals are used to indicate the structure of the fan in FIG. 2. The problem associated with ensuring that the leading edge 44 of a released fan blade 40 engages with the hook 160, and is thereby prevented from being ejected from the engine 10, is discussed above.

FIG. 3(a) illustrates an example of the fan containment arrangement 200 according to the present invention. FIG. 3(a) is a detailed and partial view of a section through and parallel to the rotational axis of a gas turbine engine 10. The fan containment arrangement 200 comprises a fan case 250. The fan case 250 further comprises a generally cylindrical containment portion 262 and a hook 260. The generally cylindrical portion 262 may be any suitable shape, for example frustoconical and/or a more complex shape in order to match as closely as possible the axial direction profile of the fan blade tips 42. The fan case 250 may be manufactured from a metal and may include other materials, for example, para-aramid synthetic fibres wrapped around the fan case 250.

The fan containment arrangement 200 has a fan track liner 252 disposed on a radially inner surface 264 of the cylindrical containment portion 262 of the face case 250. When fitted around the array of radially extending fan blades 40 the fan containment arrangement 200 will form a part of the bypass duct 13. The fan track liner 252 may comprise an attrition liner 254, a septum 256 and a honeycomb layer 258 in a similar manner to the arrangement described with respect to FIG. 2. The hook 260 is positioned in front of the array of fan blades 40 in the axial direction of the fan 12. The hook 260 projects in a generally radially inward direction.

The fan containment arrangement 200 is provided with a damaging tool 270. The damaging tool 270 is positioned radially inward of the fan case 250. Additionally, the damaging tool 270 is positioned generally radially outward of the fan blades 40; the radial direction being defined by the array of radially extending fan blades 40 when the fan containment arrangement 200 is fitted around the fan 12. When in position on the gas turbine engine 10, the fan containment arrangement 200 is fitted around the fan 12 and the damaging tool 270 projects radially inwards towards the fan blade tips 42. The damaging tool 270 has a radially inward portion/extremity or damaging tool tip 272. The damaging tool tip 272 is located radially outward of the fan blade tips 42 during normal operation of the gas turbine engine 10. Thus during everyday use of the engine 10 there is a gap or a radial clearance between the damaging tool tip 272 and the fan blades tips 42. This means during normal operation of the gas turbine engine 10 there is no contact between the fan blades tips 42 and the damaging tool tip 272.

The damaging tool 270 is provided on the fan containment arrangement 200 so as to damage the fan blade 40 (for example the fan blade tip 42 of the fan blade 40) in the event that if is released from the shaft 26. The fan blade 40 may be released from the shaft 26 because, for example, a bird, or other foreign object, has entered the air intake duct 11 of the gas turbine engine 10. When the fan blade 40 is released from the shaft 26 it moves radially outwards towards the fan containment arrangement 200. The fan blade 40 penetrates the attrition layer 254, which is designed to abrade away. The damaging tool is arranged such that it accelerates breakup of the fan track liner panel when a fan blade 40 impacts the fan track liner. The blade 40 plunges into the damaging tool tip 272 destroying the shape and structure of the fan blade tip 42. Thus the damaging tool tip 272 promotes earlier deformation of the fan blade tip 42 than would otherwise be the case without the presence of the damaging tool 270. This earlier deformation (for example crumbling or failure) of the fan blade tip 42 makes it more likely that the fan blade tip 42 will penetrate the remaining distance through the fan track liner 252 and collide with the radially inner surface 264 of the fan case 250. The damage to the fan blade tip 42 reduces the cross-sectional area of the fan blade tip 42. Additionally or alternatively, the damage may also create an irregular shaped fan blade tip 42, i.e. at least a part of the fan blade tip may become sharp and jagged. Thus the dynamic energy of the released fan blade 40 will be concentrated over a smaller cross-sectional area of the fan blade tip 42 thereby making it more likely to penetrate the fan track liner 252 to a depth beyond the attrition liner 254. The damaging tool also contributes to breakup of a fan blade. This advantageously reduces the mass of the parts likely to impact the fan case which reduces the potential force of a single impact on the casing. This means that the casing can be made thinner, reducing the weight of the fan track liner.

By penetrating fully through the fan track liner 252 the fan blade 40, which is also moving forward in an axial direction of the fan 12, collides with the hook 260 on its leading edge 44 in the region of the fan blade tip 42. Thus the fan blade 40 is contained and prevented from being ejected forward and out of the front of the gas turbine engine 10. Conversely, if the damaging tool 270 is absent then it is more likely that the fan blade tip 42 may skip across the surface of the attrition liner 254 and be ejected out the front of the engine 10.

Figure 3B:
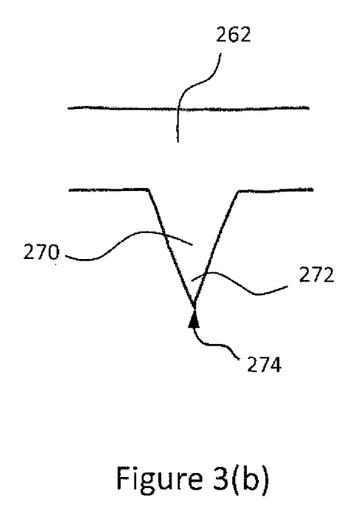
FIG. 3(b) is a detailed view of the cross-section of the fan containment arrangement of FIG. 3 showing a damaging tool in accordance with the present invention.

Optionally, the damaging tool tip 272 may have a sharp edge 274. The sharp edge 274, as described by way of example in more detail below, aids in damaging the fan blade tip 42 of a fan blade 40 released from the shaft 26. The sharp edge 274 may improve penetration of the fan blade tip 42 into the fan track liner 252 and so lead to the damage of the fan blade 40. In the example of FIG. 3(b), which is a cross-sectional profile of the damaging tool 270, the sharp edge 274 is collinear with, and defined by, the radially inner line of the damaging tool tip 272.

Figure 3C:
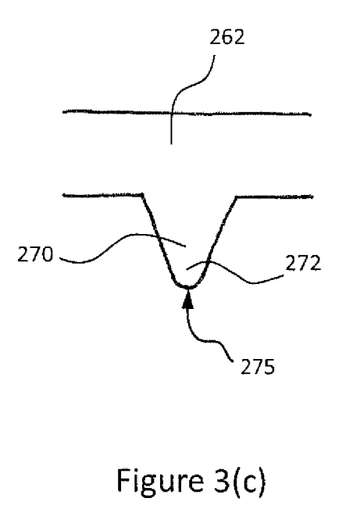
FIG. 3(c) is a detailed view of the cross-section of the fan containment arrangement of FIG. 3 showing an alternative damaging tool in accordance with the present invention.

In the FIG. 3(c) example, the damaging tool tip 272 terminates in a blunt end 275. The blunt end 275 may be sufficient to damage, or destroy, the fan blade tip 42 if it is released from the shaft 26 during a failure. Once the fan blade tip 42 of the released fan blade 40 has abraded the attrition liner 254 away, the blunt end 275 may smash and deform the fan blade tip 42 so that it penetrates the remaining distance through the fan track liner 252. This blunt end 275 arrangement may be beneficial in handling the fan casing 250 during assembly and maintenance by reducing the likelihood of injury to the handler.

The radial clearance between the damaging tool tip 272 and fan blade tips 42 is maintained in the situation where, under normal operating conditions, the fan blade tips 42 abrade away a portion of the attrition liner 254. During such normal abrasion of the attrition liner 254 the damaging tool tip 272 remains radially outward of the fan blade tips 42. To be adequately close enough to perform its function the damaging tool 270 may project radially inwards through at least a portion of the fan track liner 252. However, to ensure the functionality of the fan track liner 252, the damaging tool 270 may not project through the full thickness of the fan track liner 252. In particular, in order to maintain the functionality of the attrition liner 254 the damaging tool 270 may not project through the attrition liner 254 any great distance, if at all. The attrition liner 254 may be kept as whole, or continuously solid, as possible. In some arrangements however, the damaging tool 270 may penetrate through at least a part of the attrition liner 254, although generally such penetration would be limited to that which will allow the damaging tool 270 to perform its function, which is described herein. Where operational limitations allow, the distance that the damaging tool 270 projects through the fan track liner 252 may be up to the radially outer surface of the attrition layer 254. Alternatively, the damaging tool 270 may project up to the radially outer surface of the septum 256, for example. In some embodiments, and due to the construction of the fan tract liner 252 where the septum is very thin, the damaging tool 270 may project up to the radially outer surface of the attrition layer 254 and/or up to the septum 256.

Figure 4:
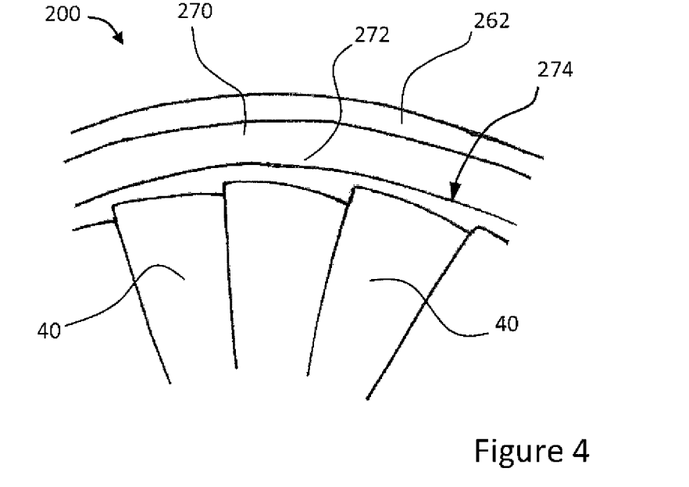
FIG. 4 is a view from the front of the gas turbine engine in the direction of arrow A in FIG. 3(a) showing a fan containment arrangement in accordance with the present invention.

The damaging tool 270 may be disposed around the entire circumference of the cylindrical containment portion 262 of the fan case 250, i.e. the damaging tool 270 may follow the full 360 degree sweep of the fan case 250. FIG. 4, which is a view in from the front of the gas turbine engine 10 in the direction of arrow A in FIG. 3(a), illustrates this arrangement. In FIG. 4, the hook 260 and fan track liner 252 are not shown for clarity reasons. Being disposed around the entire circumference of the fan case 250 is one way of ensuring that the damaging tool 270 will function, no matter the angular displacement (about the rotational axis of the fan 12) of a particular fan blade 40 that has been released from the shaft 26. In this arrangement the damaging tool 270 takes the form of a cylindrical rib, which also may be thought of as a hoop or a ring. The rib projects radially inward towards the fan blade tips 42 when the fan containment arrangement 200 is fitted around the array of radially extending fan blades 40.

Figure 5A:
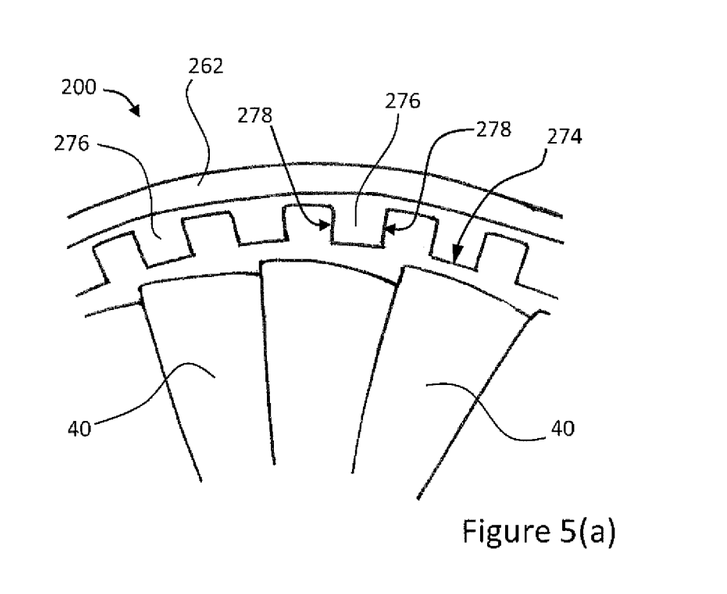
FIG. 5(a) is a view from the front of the gas turbine engine in the direction of arrow A in FIG. 3(a) showing an alternative fan containment arrangement in accordance with the present invention.

FIG. 5(a), which is also a view in the direction of arrow A in FIG. 3(a), shows an alternative fan containment arrangement 200. Again the hook 260 and fan track liner 252 are not shown for clarity reasons. The view from the front of the engine 10 illustrates that, instead of the damaging tool tip 276 being disposed around the entire circumference of the fan case 250, the damaging tool 270 may be castellated so as to form a plurality of individual teeth 276, which may be referred to as 'damaging teeth' or 'cutting teeth'. The teeth 276 may be disposed around the entire circumference of the damaging tool 270, or alternatively, only a portion of it. Thus, in the example of FIG. 5(a) the damaging tool 270 may be described as an array of the radially extending individual teeth 276. Each tooth 276 may have the same general cross-section of the damaging tool 270, including the damaging tool tip 272, as shown by way of example in the axial cross-section of FIG. 3(b) or 3(c). Each tooth 276 may have tooth edges 278 which define gaps between neighbouring teeth 276, as shown in the FIG. 5(a) example. In the FIG. 5(a) example, the damaging tool 270 is castellated in a generally square shaped tooth pattern 276. In this instance, the teeth edges 278 may in fact coincide with a radial line extending from the axis of the fan 12. Alternatively, the teeth edges 278 may take any suitable shape, for example the tooth edges 278 may be generally parallel.

It should also be noted that the gaps defined by the teeth edges 278, as illustrated in FIG. 5(a), do not fully traverse the entire radial height of the damaging tool 270 from damaging tool tip 272 to the damaging tool's 270 base, where the damaging tool 270 meets the cylindrical containment portion 262 of the fan case 250. Alternatively, it may be preferable to provide gaps between neighbouring teeth 276 which traverse the entire radial height of the damaging tool 270, i.e. the tooth edges 178 run the entire radial height of the damaging tool 270.

Figure 5B:
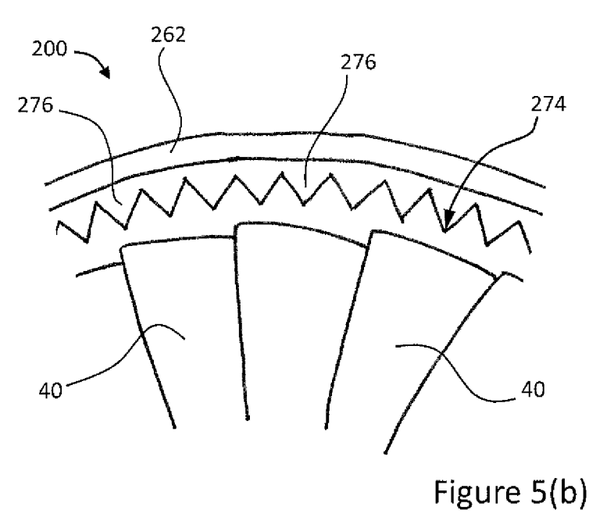
FIG. 5(b) is a view from the front of the gas turbine engine in the direction of arrow A in FIG. 3(a) showing an alternative fan containment arrangement in accordance with the present invention.

The damaging tool 270 may have alternatively shaped teeth 276. For example, the damaging tool 270 may have a plurality of teeth 276 which replicate a saw tooth pattern. For example, and as illustrated in FIG. 5(b), each of the teeth 276 may have a generally triangular profile. The triangular profile may, for example, be regular, i.e. not skewed. Alternatively, the triangular profile of the teeth 276 may be circumferentially skewed in one circumferential direction or the other, i.e. such that each tooth 276 profile does not take the general form of an isosceles triangular profile when viewed from the direction of the arrow A. In one embodiment the teeth 276 may be skewed in one circumferential direction therefore facing the triangular shaped teeth 276 towards the oncoming fan blades 40 when installed on an operating engine 10. Alternatively, the teeth 276 may be skewed in the opposite circumferential direction therefore facing the triangular shaped teeth 276 in the same direction of the oncoming fan blades 40.

Figure 6A:
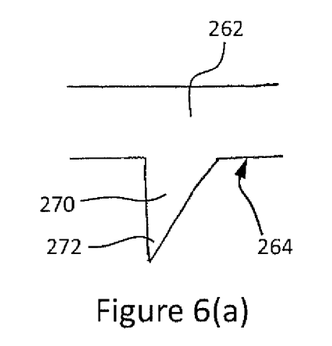
FIG. 6(a) is a detail view of the cross-section through the axis of the gas turbine engine of FIG. 1 showing an alternative damaging tool in accordance with the present invention.
Figure 6B:
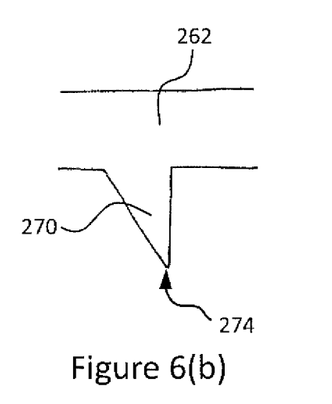
FIG. 6(b) is a detail view of the cross-section through the axis of the gas turbine engine of FIG. 1 showing an alternative damaging tool in accordance with the present invention.
Figure 6C:
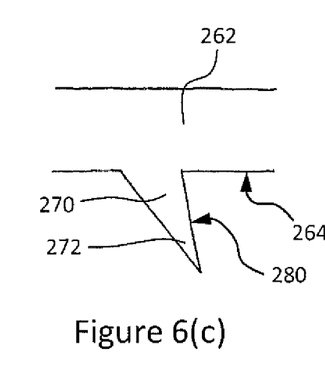
FIG. 6(c) is a detail view of the cross-section through the axis of the gas turbine engine of FIG. 1 showing an alternative damaging tool in accordance with the present invention.

FIGS. 6(a), 6(b) and 6(c) show examples of cross-sectional profiles of the damaging tool 270 by way of a cross-section through and parallel to the rotational axis of the gas turbine engine 10, i.e. the profiles are viewed in the circumferential direction of the fan case 250. As can be seen from FIGS. 3(a), 3(b), 6(a), 6(b) and 6(c), the damaging tool 270 may have a generally triangular, or wedge shaped, cross-sectional profile. FIGS. 6(a), 6(b) and 6(c) show that the damaging tool 270 may have an asymmetric cross-sectional profile; thus, whilst the damaging tool 270 may have a symmetrical profile as is shown in FIGS. 3(a) and 3(b) for example, or a non-symmetrical profile, as is shown in FIGS. 6(a), 6(b) and 6(b) for example. FIG. 6(a) shows that the damaging tool 270 may be inclined towards the front of the engine 10, while FIGS. 6(b) and 6(c) show that the damaging tool 270 may be inclined towards, or lean towards, the rear of the gas turbine engine. Such an incline may be applied to the damaging tool 270 irrespective of whether it forms a complete cylindrical rib as described above with respect to FIG. 4, or whether the damaging tool 270 is castellated to form the array of teeth 276 as described by way of example with respect to FIGS. 5(a) and 5(b).

FIG. 6(c) also shows that one of the surfaces 280 defining the damaging tool 270 may define an acute angle with the radially inner surface 264 of the cylindrical containment portion 262. In the case of the embodiment illustrated in FIG. 6(c) the acute angle is defined by the rearwards facing surface 280 of the damaging tool 270; however, the forward facing surface and radial inner surface may also define a similarly acute angle. In contrast FIGS. 6(a) and 6(b) show that either of the surfaces which define the damaging tool 270 may be arranged so as to be perpendicular to the radially inner surface 264 of the cylindrical containment portion 262.

The provision of the array of teeth 276, as described by way of example with respect to FIGS. 5(a) and 5(b), may further promote the destruction of a released fan blade 40 and its fan blade tip 42; however, a damaging tool 270 disposed around the entire circumference, as shown in FIG. 4, may function adequately and be simpler to manufacture. It can be seen from FIG. 5(a) or 5(b) that a released blade 40, which will be moving in a radial outward direction, may impact a through a series of the individual teeth 276 so as to damage the fan blade tip 42. Thus the presence of the individual teeth 276 may further promote the disintegration of the fan blade tip 42. The specific design of teeth 276, for example the castellated teeth 276 (as in FIG. 5(a)) or the saw tooth pattern (as in FIG. 5(b)), may be determined by the type of, or shape and structure, the fan blade 40 in use on the gas turbine engine 10.

When a fan blade 40 is released and is forced against the damaging tool tip 272, the attrition liner 254 may fracture, or 'break its back', more readily over the body of the damaging tool 270. In this case, the fan track liner 252 is more likely to break up earlier than in case where the damaging tool 270 is absent this may promote full penetration of the fan blade 40 into the fan track liner 252. Thus the fan blade 40 is more likely to successfully engage the hook 260. This also has the benefit of reducing the size of debris, and therefore the level of energy contained within the debris, from the destroyed fan track liner 252.

The damaging tool 270 may be integrally manufactured with the fan case 250 in the same manner as the other features present on the fan case 250. Thus the damaging tool 270 may be, for instance but not exclusively, cast as a part of the fan case 250 with a machined finishing process or machined from a solid blank of material. This may be a particularly efficient method of manufacturing all the features of the damaging tool 270. In particular, where a machining is used to create the damaging tool 270 integrally with the fan case 250, the machining process may include the forming of the sharp edge 274. The sharp edge 272 may require further finishing so that its 'edge' is suitably sharp.

Alternatively, the damaging tool 270 may be manufactured as a separate component and then mechanically fixed in position to the fan case 250. This may have an advantage in that the damaging tool 270 can then be manufactured from a different material than the fan case 250 itself. Furthermore, the damaging tool tip 272 (and therefore a sharp edge 274 where used) could be made from a different material than the main body of the damaging tool 270. In some arrangements the separately manufactured damaging tool 270 may be mechanically fixed to the fan track liner 252 instead of, or in addition to, the fan case 250.

Where, as shown in FIGS. 5(a) and 5(b), the damaging tool 270 comprises a plurality teeth 276, the teeth 276 may be manufactured integrally with the fan case 250 in the same manner described above. The integral manufacture may include the sharp edge 274 on each and every tooth 276. Alternatively, each tooth 276 may be manufactured separately and installed on the fan case 250. The installation may be as one complete circumferential damaging tool 270, or alternatively, installed tooth-by-tooth 276 into the fan case 250 such that the damaging tool 270 is formed by the array of the individual teeth 276. Alternatively, the teeth 276 may be installed in segments having a plurality of the teeth 276. This method of manufacture may allow specialty tool materials to be used for the teeth 276 of the damaging tool 270 so that, for example, a suitably hard material may be used.

Figure 7:
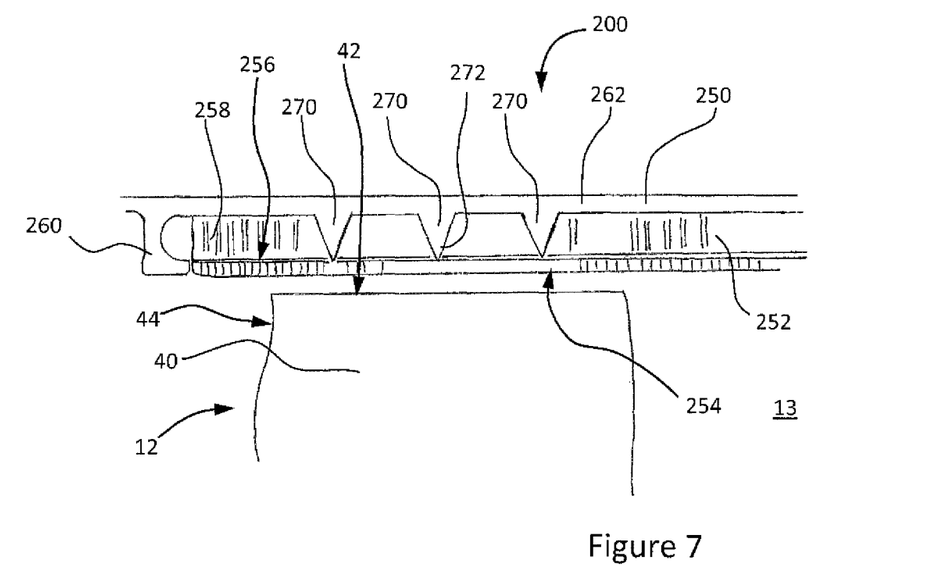
FIG. 7 is a partial view of the cross-section through and parallel to the axis of the gas turbine engine of FIG. 1 showing a fan containment arrangement incorporating an alternative embodiment of the present invention.

In alternative examples of the fan containment arrangement 200 more than one damaging tool 270 may be provided. In one such alternative, it is envisioned that an array of damaging tools 270 may be provided spaced apart in the axial direction of the gas turbine engine 10. FIG. 7 shows one such example of an array of damaging tools 270. In FIG. 7, by way of example, three damaging tools 270 are shown in series and spaced apart from the front towards the rear of the gas turbine engine 10, in other words, distributed along the engine 10 axis. Where appropriate, a different number of damaging tools 270 may be used. The array of damaging tools 270 may alternatively be described as a linearly spaced series of cylindrical rings or hoop-like damaging tools 270. The use of more than one damaging tool 270 arranged in this manner provides more than one point where the fan blade tip 42 may be damaged on release of a fan blade 40 from the shaft 26. If one damaging tool 270 is missed by the released fan blade 40, then it may be damaged by another damaging tool 270. Thus, the likelihood of the fan blade 40 penetrating the full depth of the fan track liner 252 may be increased. Optionally, one, or some, or all of the damaging tools 270 may be provided with teeth 276 in the manner described above with respect to FIGS. 5(a) and 5(b).

Figure 8A:
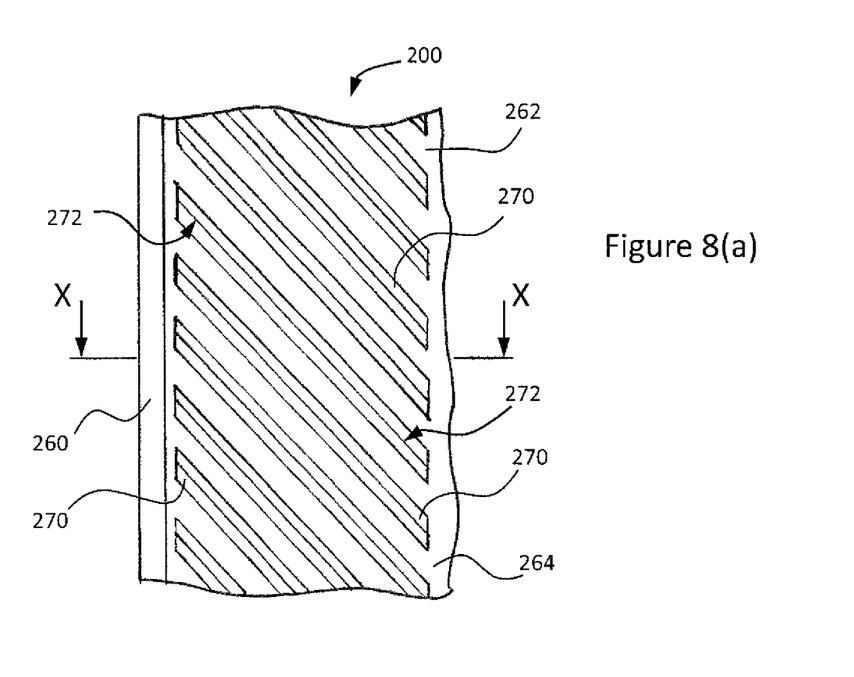
FIG. 8(a) is a development of a portion of the fan case of a fan containment arrangement incorporating an alternative embodiment of the present invention.
Figure 8B:
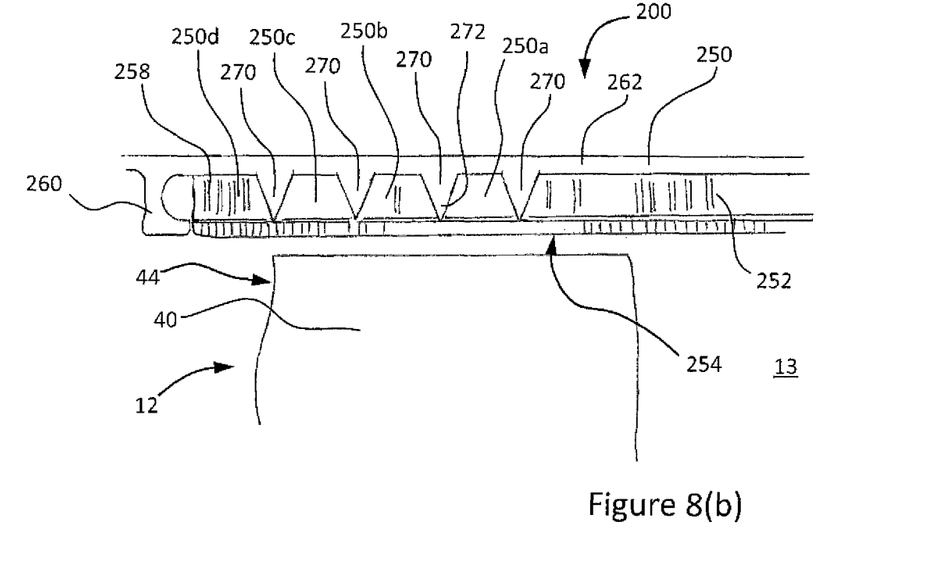
FIG. 8(b) is a partial view of the cross-section through and parallel to the axis of the gas turbine engine of FIG. 1 showing the fan containment arrangement of FIG. 8(a)
Figure 8C:
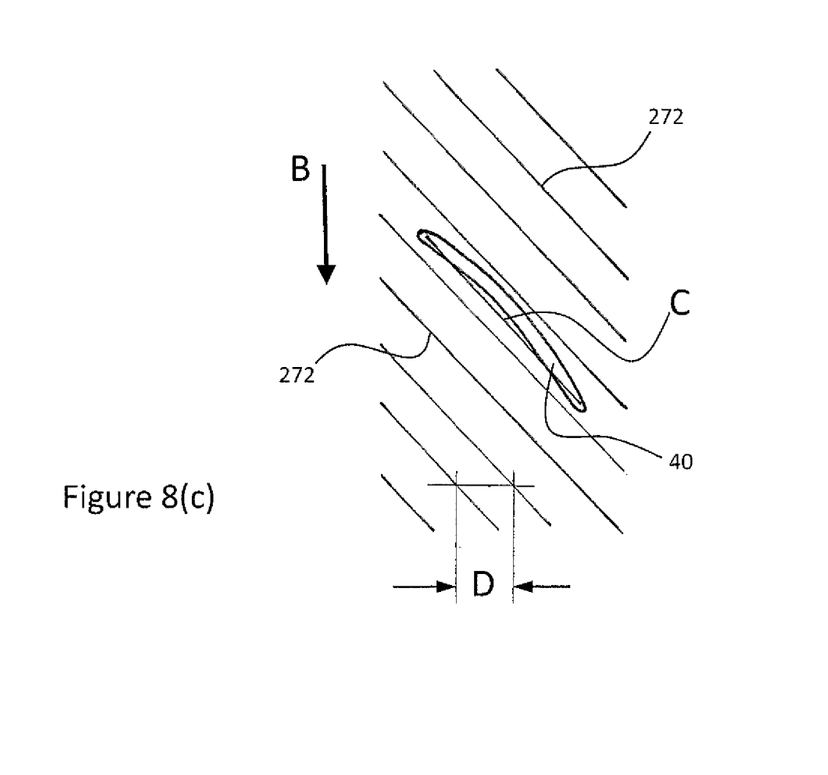
FIG. 8(c) is a schematic illustration of the fan case of the fan containment arrangement illustrated in FIG. 8(a).

FIGS. 8(a), 8(b) and 8(c) illustrate another example of the fan containment arrangement 200 provided with more than one damaging tool 270. FIG. 8(a) is a development of a portion of the cylindrical containment portion 262 of the fan case 250 such that it is viewed, as if flattened, from a radially inner position. FIG. 8(b) is a partial view of the fan containment arrangement 200 by way of a cross-section through the axis of the gas turbine engine 10 in a similar manner to the view shown in FIG. 3(a). The cross section illustrated in FIG. 8(b) is additionally marked for reference by the line X-X in FIG. 8(a).

FIGS. 8(a) and 8(b) show an array of helical damaging tools 270 which are circumferentially disposed against the radially inner surface 264 of the cylindrical containment portion 262 of the fan case 250. Put another way, the damaging tools 270 are spaced apart in the circumferential direction of the radially inner surface 264 of the cylindrical containment portion 262. Each damaging tool 270 is helical in shape, or of a helical nature in that the intersection of the damaging tool 270 with the cylindrical containment portion 262 forms a helical path, curve or profile, which is disposed against the radially inner surface 264 of the cylindrical containment portion 262. Thus, each damaging tool 270 follows a helical path disposed against the radially inner surface 264 of the cylindrical containment portion 262. Additionally, the damaging tool tip 272 of each damaging tool 270 follows a helical path, or helical profile, which is radially inwards of the cylindrical containment portion 262 and has a helical pitch and lead angle that corresponds with the pitch and lead angle of the intersecting helical path on the cylindrical containment portion. The helical path may be alternatively determined by a helix angle depending on preference. Put another way, the helical damaging tools 270 are linear damaging tools 270 which are wrapped around the radially inner surface 264 of the cylindrical containment portion 262 of the fan case 250. FIG. 8(b) shows, for reference, the cross-sectional profile of the plurality helical damaging tools 270 relative to the fan blade 40 and its fan blade tip 42. Because of the helical shape of the damaging tools 270 the fan track liner 252 may be installed in fan track liner segments 252a, 252b, 252c, 252d, which are shown in FIG. 8(b). The fan track liner segments 252a, 252b, 252c, 252d need to be installed between the helical shaped damaging tools 270 to complete the fan track liner 252. As with any embodiment teeth 276 and/or an asymmetric cross-sectional profile may be used.

FIG. 8(c) shows schematically how the helical path of the damaging tool 270/damaging tool tip 272, which is dictated by its lead angle (or complementary helix angle), may be arranged relative to the chord line of the rotating fan blade 40. FIG. 8(c) is a flattened view in the same manner as FIG. 8(a). In FIG. 8(c) a chord line C of the fan blade 40 at, or near, the fan blade tip 42 is shown. The fan blade 40 rotates in the direction of arrow B. The chord line C is generally parallel to the helical path which prescribes the shape of the damaging tools 270. The helical path is indicated in FIG. 8(c) schematically by lines which represent the damaging tool tips 272 of the damaging tools 270. The offset pitch between the helical paths of each damaging tool 270 is indicated by dimension D in FIG. 8(c). Dimension D may be dictated by the particular design requirements of the gas turbine engine 10. By making the chord line C generally parallel to the helical path, which is followed by the damaging tools 270, the fan blade tip 42 is more likely to contact the damaging tool tip 272 when the fan blade 40 is released from the shaft 26. Additionally, the helical path of the damaging tool 270 may guide the fan blade 40 into the hook 260. Thus, because of both of these actions of the damaging tool 270, the fan blade 40 is more likely to engage the hook 260 and be prevented from being ejected from the engine 10. In other examples however, the chord line may be at an angle to the helical path.

Although, FIGS. 8(a), 8(b) and 8(c) show an array of helically shaped damaging tools 270 disposed against the cylindrical containment portion of the fan case 250, this does not preclude the possibility of a single helical damaging tool 270 being provided on the fan containment arrangement 200. Such a helical damaging tool 270 would be likely to have a very shallow, or small, helix angle so that the damaging tool 270 encompasses the entire circumference of the cylindrical containment portion 262 at least once. The helically shaped damaging tool has been found to be particularly advantageous because the damaging tool performs the additional function of directing a released fan blade towards the hook for impact therewith.

Although the fan containment arrangement 200 is described for use on gas turbine engines 10 with metallic fan blades 40 other materials may be used, e.g. composite materials. Both composite fan blades and metal fan blades are expected to be effectively contained by the fan containment system 200, as described above.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The invention claimed is:

1. A fan assembly comprising:
   a radial array of fan blades mounted to a hub in an axial gas turbine engine, each fan blade having a respective fan blade tip; and
   a fan containment system arranged to be fitted around the fan blades, each fan blade having a respective fan blade tip, the fan containment system comprising:
      a generally cylindrical fan case including a hook, the hook projecting in a generally radially inward direction and positioned axially forward of the radial array of fan blades when the fan assembly is fitted around the radial array of fan blades;
      a fan track liner disposed on the radially inner surface of the fan case; and
      a damaging tool which projects radially inwards from the fan case towards the fan blade tips when the fan assembly is fitted around the array of radially extending fan blades, the damaging tool having a tip which is radially outward of the fan blade tips during normal operation of the gas turbine engine,
   wherein the damaging tool is configured such that in the event that, during operation of the gas turbine engine, one of the fan blades is released from the hub, the tip of the damaging tool damages the fan blade tip of the released fan blade so as to promote penetration of the fan blade into the fan track liner and ensure the fan blade collides with the hook,
   wherein the damaging tool follows a path disposed against the radially inner surface of the fan case, and
   wherein the fan blade tip defines a chord line, and the path disposed against the radially inner surface of the fan case is generally parallel to the chord line when fitted around the array of radially extending fan blades.

2. A fan assembly as claimed in claim 1 wherein the tip of the damaging tool has a sharp edge.

3. A fan assembly as claimed in claim 1 wherein the damaging tool comprises a wedge shaped cylindrical rib disposed against the radially inner surface of the fan case.

4. A fan assembly as claimed in claim 3 wherein the wedge has a symmetrical cross-sectional profile.

5. A fan assembly as claimed in claim 3 wherein the wedge has an asymmetrical cross-sectional profile such that it is inclined aft or forwards towards the respective back or front of the gas turbine engine.

6. A fan assembly as claimed in claim 1 wherein the damaging tool is castellated so as to form a plurality of teeth.

7. A fan assembly as claimed in claim 6 wherein the damaging tool comprises an array of radially extending individually formed teeth.

8. A fan assembly as claimed in claim 1 wherein the damaging tool is disposed around the entire circumference of the radially inner surface of the fan case.

9. A fan assembly as claimed in claim 1 wherein the damaging tool is one of a plurality of damaging tools spaced apart in the axial direction of the fan case.

10. A fan assembly as claimed in claim 1 wherein the path is a helical path such that the damaging tool has a helical shape by way of following the helical path disposed against the radially inner surface of the fan case.

11. A fan assembly as claimed in claim 1 wherein the damaging tool is one of an array of damaging tools disposed around the radially inner surface of the fan case in a circumferential direction of the radially inner surface.

12. A fan assembly as claimed in claim 1 wherein the damaging tool projects partially through the thickness of the fan track liner.

13. A fan assembly as claimed in claim 12 wherein the fan track liner comprises a radially outer honeycomb layer and a radially inner attrition layer.

14. A fan assembly as claimed in claim 13 wherein the honeycomb layer and the radially inner attrition layer are separated by a septum.

15. A fan assembly as claimed in claim 13 wherein the damaging tool projects through the thickness of the fan track liner up to the radially outer surface of the attrition liner.

16. A gas turbine engine comprising a fan assembly as claimed in claim 1.

* * * * *